DOUBLE ERROR CORRECTING SYSTEM

Filed Dec. 22, 1959 7 Sheets-Sheet 1

| | $D_1$ | $D_2$ | $D_3$ | $D_4$ | $D_5$ | $D_6$ | $D_7$ | $D_8$ | $D_9$ | $D_{10}$ | $P_1$ | $P_2$ | $P_3$ | $P_4$ | $P_0$ |
|---|---|---|---|---|---|---|---|---|---|---|---|---|---|---|---|
| $P_1$ | X | | X | | | X | X | | X | X | X | | | | |
| $P_2$ | | X | | X | | | X | X | | X | X | X | | | |
| $P_3$ | | | X | | X | | | X | X | | X | X | X | | |
| $P_4$ | | | | X | | X | | | X | X | | X | X | X | |
| $P_0$ | X | X | X | X | X | X | X | X | X | X | X | X | X | X | X |

*INVENTOR.*
NORMAN M. ABRAMSON
*BY* Richard E. Cummins
ATTORNEY

Dec. 29, 1964 N. M. ABRAMSON 3,163,848

DOUBLE ERROR CORRECTING SYSTEM

Filed Dec. 22, 1959 7 Sheets-Sheet 2

ENCODING OF: $D_{10}$ $D_9$ $D_8$ $D_7$ $D_6$ $D_5$ $D_4$ $D_3$ $D_2$ $D_1$ →
1 0 1 0 1 0 0 1 1 0

| CLOCK | SHIFT | DATA IN | $F_1$ | $F_2$ | $F_3$ | $F_4$ | $F_1'$ | $F_2'$ | $F_3'$ | $F_4'$ | $P_1$ | $P_2$ | $P_3$ | $P_4$ | $P_0$ | DATA OUT 13 | | | | | | | | | | | | | | |
|---|---|---|---|---|---|---|---|---|---|---|---|---|---|---|---|---|---|---|---|---|---|---|---|---|---|---|---|---|---|---|
| | | | | | | | | | | | | | | | | 1 | 2 | 3 | 4 | 5 | 6 | 7 | 8 | 9 | 10 | 11 | 12 | 13 | 14 | 15 |
| $C_0$ | | | 1 | 1 | 1 | 1 | 0 | 0 | 0 | 0 | 0 | 0 | 0 | 0 | | – | | | | | | | | | | | | | | |
| | 1 | | 0 | 1 | 1 | 1 | 1 | 0 | 0 | 0 | | | | | | | | | | | | | | | | | | | | |
| 1 | | $D_1$ 0 | | | | | | | | | 0 | 0 | 0 | 0 | 0 | 0 | – | | | | | | | | | | | | | |
| | 2 | | 1 | 0 | 1 | 1 | 0 | 1 | 0 | 0 | | | | | | | | | | | | | | | | | | | | |
| 2 | | $D_2$ 1 | | | | | | | | | 0 | 1 | 0 | 0 | 1 | 1 | 0 | – | | | | | | | | | | | | |
| | 3 | | 0 | 1 | 0 | 1 | 1 | 0 | 1 | 0 | | | | | | | | | | | | | | | | | | | | |
| 3 | | $D_3$ 1 | | | | | | | | | 1 | 1 | 1 | 0 | 0 | 1 | 1 | 0 | – | | | | | | | | | | | |
| | 4 | | 1 | 0 | 1 | 0 | 0 | 1 | 0 | 1 | | | | | | | | | | | | | | | | | | | | |
| 4 | | $D_4$ 0 | | | | | | | | | 1 | 1 | 1 | 0 | 0 | 0 | 1 | 1 | 0 | – | | | | | | | | | | |
| | 5 | | 1 | 1 | 0 | 1 | 0 | 0 | 1 | 0 | | | | | | | | | | | | | | | | | | | | |
| 5 | | $D_5$ 0 | | | | | | | | | 1 | 1 | 1 | 0 | 0 | 0 | 0 | 1 | 1 | 0 | – | | | | | | | | | |
| | 6 | | 0 | 1 | 1 | 0 | 1 | 0 | 0 | 1 | | | | | | | | | | | | | | | | | | | | |
| 6 | | $D_6$ 1 | | | | | | | | | 0 | 1 | 1 | 1 | 1 | 1 | 0 | 0 | 1 | 1 | 0 | – | | | | | | | | |
| | 7 | | 0 | 0 | 1 | 1 | 1 | 1 | 0 | 0 | | | | | | | | | | | | | | | | | | | | |
| 7 | | $D_7$ 0 | | | | | | | | | 0 | 1 | 1 | 1 | 1 | 0 | 1 | 0 | 0 | 1 | 1 | 0 | – | | | | | | | |
| | 8 | | 1 | 0 | 0 | 1 | 0 | 1 | 1 | 0 | | | | | | | | | | | | | | | | | | | | |
| 8 | | $D_8$ 1 | | | | | | | | | 0 | 0 | 0 | 1 | 0 | 1 | 0 | 1 | 0 | 0 | 1 | 1 | 0 | – | | | | | | |
| | 9 | | 0 | 1 | 0 | 0 | 1 | 0 | 1 | 1 | | | | | | | | | | | | | | | | | | | | |
| 9 | | $D_9$ 0 | | | | | | | | | 0 | 0 | 0 | 1 | 0 | 0 | 1 | 0 | 1 | 0 | 0 | 1 | 1 | 0 | – | | | | | |
| | 10 | | 0 | 0 | 1 | 0 | 1 | 1 | 0 | 1 | | | | | | | | | | | | | | | | | | | | |
| 10 | | $D_{10}$ 1 | | | | | | | | | 1 | 1 | 0 | 0 | 1 | 1 | 0 | 1 | 0 | 1 | 0 | 0 | 1 | 1 | 0 | – | | | | |
| | 11 | | 0 | 0 | 0 | 1 | 1 | 1 | 1 | 0 | | | | | | | | | | | | | | | | | | | | |
| 11 | | $P_1$ 1 | | | | | | | | | 0 | 0 | 1 | 0 | 0 | 1 | 1 | 0 | 1 | 0 | 1 | 0 | 0 | 1 | 1 | 0 | – | | | |
| | 12 | | 1 | 0 | 0 | 0 | 0 | 1 | 1 | 1 | | | | | | | | | | | | | | | | | | | | |
| 12 | | $P_2$ 0 | | | | | | | | | 0 | 0 | 1 | 0 | 0 | 0 | 1 | 1 | 0 | 1 | 0 | 1 | 0 | 0 | 1 | 1 | 0 | – | | |
| | 13 | | 1 | 1 | 0 | 0 | 0 | 0 | 1 | 1 | | | | | | | | | | | | | | | | | | | | |
| 13 | | $P_3$ 1 | | | | | | | | | 0 | 0 | 0 | 1 | 1 | 1 | 0 | 1 | 1 | 0 | 1 | 0 | 1 | 0 | 0 | 1 | 1 | 0 | – | |
| | 14 | | 1 | 1 | 1 | 0 | 0 | 0 | 0 | 1 | | | | | | | | | | | | | | | | | | | | |
| 14 | | $P_4$ 1 | | | | | | | | | 0 | 0 | 0 | 0 | 0 | 1 | 1 | 0 | 1 | 1 | 0 | 1 | 0 | 1 | 0 | 0 | 1 | 1 | 0 | – |
| | 15 | | 1 | 1 | 1 | 1 | 0 | 0 | 0 | 0 | | | | | | | | | | | | | | | | | | | | |
| 15 | | $P_0$ 0 | | | | | | | | | 0 | 0 | 0 | 0 | 0 | 0 | 1 | 1 | 0 | 1 | 1 | 0 | 1 | 0 | 1 | 0 | 0 | 1 | 1 | 0 |
| | 1 | | 0 | 1 | 1 | 1 | 1 | 0 | 0 | 0 | | | | | | | | | | | | | | | | | | | | |

FIG. 3

Dec. 29, 1964 N. M. ABRAMSON 3,163,848

DOUBLE ERROR CORRECTING SYSTEM

Filed Dec. 22, 1959 7 Sheets-Sheet 4

DECODING - NO ERROR: $P_0\ P_4\ P_3\ P_2\ P_1\ D_{10}\ D_9\ D_8\ D_7\ D_6\ D_5\ D_4\ D_3\ D_2\ D_1$ →

0 1 1 0 0 1 0 1 0 1 0 0 1 1 0

| CLOCK | SHIFT | DATA IN | $F_1\ F_2\ F_3\ F_4$ | $F_1'\ F_2'\ F_3'\ F_4'$ | $RP_1\ RP_2\ RP_3\ RP_4$ | $RP_0$ | SHIFT REGISTER 1 | 2 | 3 | 4 | 5 | 6 | 7 | 8 | 9 | 10 | C |
|---|---|---|---|---|---|---|---|---|---|---|---|---|---|---|---|---|---|
| | | | 1 1 1 1 | 0 0 0 0 | 0 0 0 0 | | | | | | | | | | | | |
| | 1 | | 0 1 1 1 | 1 0 0 0 | | | | | | | | | | | | | |
| 1 | | $D_1$ 0 | | | 0 0 0 0 | 0 | 0 | | | | | | | | | | |
| | 2 | | 1 0 1 1 | 0 1 0 0 | | | | 0 | | | | | | | | | |
| 2 | | $D_2$ 1 | | | 0 1 0 0 | 1 | 1 | 0 | | | | | | | | | |
| | 3 | | 0 1 0 1 | 1 0 1 0 | | | | 1 | 0 | | | | | | | | |
| 3 | | $D_3$ 1 | | | 1 1 1 0 | 0 | 1 | 1 | 0 | | | | | | | | |
| | 4 | | 1 0 1 0 | 0 1 0 1 | | | | 1 | 1 | 0 | | | | | | | |
| 4 | | $D_4$ 0 | | | 1 1 1 0 | 0 | 0 | 1 | 1 | 0 | | | | | | | |
| | 5 | | 1 1 0 1 | 0 0 1 0 | | | | 0 | 1 | 1 | 0 | | | | | | |
| 5 | | $D_5$ 0 | | | 1 1 1 0 | 0 | 0 | 0 | 1 | 1 | 0 | | | | | | |
| | 6 | | 0 1 1 0 | 1 0 0 1 | | | | 0 | 0 | 1 | 1 | 0 | | | | | |
| 6 | | $D_6$ 1 | | | 0 1 1 1 | 1 | 1 | 0 | 0 | 1 | 1 | 0 | | | | | |
| | 7 | | 0 0 1 1 | 1 1 0 0 | | | | 1 | 0 | 0 | 1 | 1 | 0 | | | | |
| 7 | | $D_7$ 0 | | | 0 1 1 1 | 1 | 0 | 1 | 0 | 0 | 1 | 1 | 0 | | | | |
| | 8 | | 1 0 0 1 | 0 1 1 0 | | | | 0 | 1 | 0 | 0 | 1 | 1 | 0 | | | |
| 8 | | $D_8$ 1 | | | 0 0 0 1 | 0 | 1 | 0 | 1 | 0 | 0 | 1 | 1 | 0 | | | |
| | 9 | | 0 1 0 0 | 1 0 1 1 | | | | 1 | 0 | 1 | 0 | 0 | 1 | 1 | 0 | | |
| 9 | | $D_9$ 0 | | | 0 0 0 1 | 0 | 0 | 1 | 0 | 1 | 0 | 0 | 1 | 1 | 0 | | |
| | 10 | | 0 0 1 0 | 1 1 0 1 | | | | 0 | 1 | 0 | 1 | 0 | 0 | 1 | 1 | 0 | |
| 10 | | $D_{10}$ 1 | | | 1 1 0 0 | 1 | 1 | 0 | 1 | 0 | 1 | 0 | 0 | 1 | 1 | 0 | |
| | 11 | | 0 0 0 1 | 1 1 1 0 | | | | | | | | | | | | | |
| 11 | | $P_1$ 1 | | | 0 0 1 0 | 0 | | | | | | | | | | | |
| | 12 | | 1 0 0 0 | 0 1 1 1 | | | | | | | | | | | | | |
| 12 | | $P_2$ 0 | | | 0 0 1 0 | 0 | | | | | | | | | | | |
| | 13 | | 1 1 0 0 | 0 1 1 1 | | | | | | | | | | | | | |
| 13 | | $P_3$ 1 | | | 0 0 0 1 | 1 | | | | | | | | | | | |
| | 14 | | 1 1 1 0 | 0 0 0 1 | | | | | | | | | | | | | |
| 14 | | $P_4$ 1 | | | 0 0 0 0 | 0 | | | | | | | | | | | |
| | 15 | | 1 1 1 1 | 0 0 0 0 | | | | | | | | | | | | | |
| 15 | | $P_0$ 0 | | | 0 0 0 0 | 0 | | | | | | | | | | | |
| | 1 | | | | | | - | 1 | 0 | 1 | 0 | 1 | 0 | 0 | 1 | 1 | 0 |

FIG. 5

DOUBLE ERROR CORRECTING SYSTEM

Filed Dec. 22, 1959 7 Sheets–Sheet 6

| P0 | P4 | P3 | P2 | P1 | D10 | D9 | D8 | D7 | D6 | D5 | D4 | D3 | D2 | D1 |
|---|---|---|---|---|---|---|---|---|---|---|---|---|---|---|
| 0 | 1 | 1 | 0 | 1 | 1 | 0 | 1 | 0 | 0 | 0 | 0 | 1 | 1 | 0 |

| D10 | D9 | D8 | D7 | D6 | D5 | D4 | D3 | D2 | D1 |
|---|---|---|---|---|---|---|---|---|---|
| 1 | 0 | 1 | 0 | 1 | 0 | 0 | 1 | 1 | 0 |

| CLOCK | SHIFT | IN | | TRUE F1 | TRUE F2 | TRUE F3 | TRUE F4 | COMPLEMENT F1 | COMPLEMENT F2 | COMPLEMENT F3 | COMPLEMENT F4 | P1 | P2 | P3 | P4 | P0 | 1 | 2 | 3 | 4 | 5 | 6 | 7 | 8 | 9 | 10 | C | |
|---|---|---|---|---|---|---|---|---|---|---|---|---|---|---|---|---|---|---|---|---|---|---|---|---|---|---|---|---|
| RESET | | | | 1 | 1 | 1 | 1 | 0 | 0 | 0 | 0 | 0 | 0 | 0 | 0 | 0 | – | – | – | – | – | – | – | – | – | – | | |
| | 1 | | | 0 | 1 | 1 | 1 | 1 | 0 | 0 | 0 | | | | | | | | | | | | | | | | | |
| 1 | | D1 | 0 | | | | | | | | | 0 | 0 | 0 | 0 | 0 | 0 | | | | | | | | | | | |
| | 2 | | | 1 | 0 | 1 | 1 | 0 | 1 | 0 | 0 | | | | | | | | | | | | | | | | | |
| 2 | | D2 | 1 | | | | | | | | | 0 | 1 | 0 | 0 | 1 | 1 | 0 | | | | | | | | | | |
| | 3 | | | 0 | 1 | 0 | 1 | 1 | 0 | 1 | 0 | | | | | | | | | | | | | | | | | |
| 3 | | D3 | 1 | | | | | | | | | 1 | 1 | 1 | 0 | 0 | 1 | 1 | 0 | | | | | | | | | |
| | 4 | | | 1 | 0 | 1 | 0 | 0 | 1 | 0 | 1 | | | | | | | | | | | | | | | | | |
| 4 | | D4 | 0 | | | | | | | | | 1 | 1 | 1 | 0 | 0 | 0 | 1 | 1 | 0 | | | | | | | | |
| | 5 | | | 1 | 1 | 0 | 1 | 0 | 0 | 1 | 0 | | | | | | | | | | | | | | | | | |
| 5 | | D5 | 0 | | | | | | | | | 1 | 1 | 1 | 0 | 0 | 0 | 0 | 1 | 1 | 0 | | | | | | | |
| | 6 | | | 0 | 1 | 1 | 0 | 1 | 0 | 0 | 1 | | | | | | | | | | | | | | | | | |
| 6 | | D6 | 0 | | | | | | | | | 1 | 1 | 1 | 0 | 0 | 0 | 0 | 0 | 1 | 1 | 0 | | | | | | |
| | 7 | | | 0 | 0 | 1 | 1 | 1 | 1 | 0 | 0 | | | | | | | | | | | | | | | | | |
| 7 | | D7 | 0 | | | | | | | | | 1 | 1 | 1 | 0 | 0 | 0 | 0 | 0 | 0 | 1 | 1 | 0 | | | | | |
| | 8 | | | 1 | 0 | 0 | 1 | 0 | 1 | 1 | 0 | | | | | | | | | | | | | | | | | |
| 8 | | D8 | 1 | | | | | | | | | 1 | 0 | 0 | 0 | 1 | 1 | 0 | 0 | 0 | 0 | 1 | 1 | 0 | | | | |
| | 9 | | | 0 | 1 | 0 | 0 | 1 | 0 | 1 | 1 | | | | | | | | | | | | | | | | | |
| 9 | | D9 | 0 | | | | | | | | | 1 | 0 | 0 | 0 | 1 | 0 | 1 | 0 | 0 | 0 | 0 | 1 | 1 | 0 | | | |
| | 10 | | | 0 | 0 | 1 | 0 | 1 | 1 | 0 | 1 | | | | | | | | | | | | | | | | | |
| 10 | | D10 | 1 | | | | | | | | | 0 | 1 | 0 | 1 | 0 | 1 | 0 | 1 | 0 | 0 | 0 | 0 | 1 | 1 | 0 | | |
| | 11 | | | 0 | 0 | 0 | 1 | 1 | 1 | 1 | 0 | | | | | | | | | | | | | | | | | |
| 11 | | P1 | 1 | | | | | | | | | 1 | 0 | 1 | 1 | 1 | 1 | 0 | 1 | 0 | 0 | 0 | 0 | 1 | 1 | 0 | | |
| | 12 | | | 1 | 0 | 0 | 0 | 0 | 1 | 1 | 1 | | | | | | | | | | | | | | | | | |
| 12 | | P2 | 0 | | | | | | | | | 1 | 0 | 1 | 1 | 1 | 1 | 0 | 1 | 0 | 0 | 0 | 0 | 1 | 1 | 0 | | |
| | 13 | | | 1 | 1 | 0 | 0 | 0 | 0 | 1 | 1 | | | | | | | | | | | | | | | | | |
| 13 | | P3 | 1 | | | | | | | | | 1 | 0 | 0 | 0 | 0 | 1 | 0 | 1 | 0 | 0 | 0 | 0 | 1 | 1 | 0 | | |
| | 14 | | | 1 | 1 | 1 | 0 | 0 | 0 | 0 | 1 | | | | | | | | | | | | | | | | | |
| 14 | | P4 | 1 | | | | | | | | | 1 | 0 | 0 | 1 | 1 | 1 | 0 | 1 | 0 | 0 | 0 | 0 | 1 | 1 | 0 | | |
| | 15 | | | 1 | 1 | 1 | 1 | 0 | 0 | 0 | 0 | | | | | | | | | | | | | | | | | |
| 15 | | P0 | 0 | | | | | | | | | 1 | 0 | 0 | 1 | 1 | 1 | 0 | 1 | 0 | 0 | 0 | 0 | 1 | 1 | 0 | | |
| | | | | | | | | | | | | | | | | | | | | | | | | | | | | |
| | | | | | | | | | | | | | | | | | 1 | 0 | 1 | 0 | 0 | 0 | 0 | 1 | 1 | 0 | | |
| | 1 | | | 0 | 1 | 1 | 0 | 1 | 0 | 0 | 1 | 1 | 0 | 0 | 1 | 1 | | 1 | 0 | 1 | 0 | 0 | 0 | 1 | 1 | 1 | 0 | |
| | 2 | | | 1 | 0 | 1 | 1 | 0 | 1 | 0 | 0 | 1 | 0 | 0 | 1 | 1 | | | 1 | 0 | 1 | 0 | 0 | 0 | 1 | 1 | 1 | |
| | 3 | | | 0 | 1 | 0 | 1 | 1 | 0 | 1 | 0 | 1 | 0 | 0 | 1 | 1 | | | | 1 | 0 | 1 | 0 | 0 | 0 | 1 | 1 | |
| | 4 | | | 1 | 0 | 1 | 0 | 0 | 1 | 0 | 1 | 1 | 0 | 0 | 1 | 1 | | | | | 1 | 0 | 1 | 0 | 0 | 0 | 0 | |
| | 5 | | | 1 | 1 | 0 | 1 | 0 | 0 | 1 | 0 | 1 | 0 | 0 | 1 | 1 | | | | | | 1 | 0 | 1 | 0 | 0 | 0 | |
| | 6 | | | 0 | 1 | 1 | 0 | 1 | 0 | 0 | 1 | 1 | 0 | 0 | 1 | 1 | ← COMPARE | | | | | | | 0 | 1 | 0 | (1) | |
| | 7 | | | 0 | 0 | 1 | 1 | 1 | 1 | 0 | 0 | 0 | 0 | 0 | 0 | 0 | | | CORRECTION | | | | | 1 | 0 | 1 | 0 | |
| | 8 | | | 1 | 0 | 0 | 1 | 0 | 1 | 1 | 0 | ↑ | ↑ | ↑ | ↑ | ↑ | | | | | | | | | 1 | 0 | 1 | |
| | 9 | | | 0 | 1 | 0 | 0 | 1 | 0 | 1 | 1 | | | | | | | | | | | | | | | 1 | 0 | |
| | 10 | | | 0 | 0 | 1 | 0 | 1 | 1 | 0 | 1 | | | | | | | | | | | | | | | | 1 | |
| | 11 | | | 0 | 0 | 0 | 1 | 1 | 1 | 1 | 0 | | | | | | | | | | | | | | | | | |
| | 12 | | | 1 | 0 | 0 | 0 | 0 | 1 | 1 | 1 | | | | | | | | | | | | | | | | | |
| | 13 | | | 1 | 1 | 0 | 0 | 0 | 0 | 1 | 1 | | | | | | | | | | | | | | | | | |
| | 14 | | | 1 | 1 | 1 | 0 | 0 | 0 | 0 | 1 | ↓ | ↓ | ↓ | ↓ | ↓ | | | | | | | | | | | | |
| | 15 | | | 1 | 1 | 1 | 1 | 0 | 0 | 0 | 0 | 0 | 0 | 0 | 0 | 0 | | | | | | | | | | | | |
| | 1 | | | 1 | 1 | 1 | 1 | 0 | 0 | 0 | 0 | 0 | 0 | 0 | 0 | 0 | – | – | – | – | – | – | – | – | – | – | – | – |

FIG. 6

→

Po P1 P3 P2 P1 D10 D9 D8 D7 D6 D5 D4 D3 D2 D1
0 1 1 0 1 1 0 0 1 1 0 0 1 1 0

→

D10 D9 D8 D7 D6 D5 D4 D3 D2 D1
1 0 1 0 1 0 0 1 1 0

| CLOCK | SHIFT | D-IN | | TRUE | | | | COMPLEMENT | | | | | | | | | | | | | | | | | | | | |
|---|---|---|---|---|---|---|---|---|---|---|---|---|---|---|---|---|---|---|---|---|---|---|---|---|---|---|---|---|
| | | | | F1 | F2 | F3 | F4 | F1 | F2 | F3 | F4 | P1 | P2 | P3 | P4 | P0 | 1 | 2 | 3 | 4 | 5 | 6 | 7 | 8 | 9 | 10 | C | |
| Co RESET | | | | 1 | 1 | 1 | 1 | 0 | 0 | 0 | 0 | 0 | 0 | 0 | 0 | 0 | | | | | | | | | | | | |
| | 1 | | | 0 | 1 | 1 | 1 | 1 | 0 | 0 | 0 | | | | | | | | | | | | | | | | | |
| 1 | | D1 | 0 | | | | | | | | | 0 | 0 | 0 | 0 | 0 | 0 | | | | | | | | | | | |
| | 2 | | | 1 | 0 | 1 | 1 | 0 | 1 | 0 | 0 | | | | | | | | | | | | | | | | | |
| 2 | | D2 | 1 | | | | | | | | | 0 | 1 | 0 | 0 | 1 | 1 | 0 | | | | | | | | | | |
| | 3 | | | 0 | 1 | 0 | 1 | 1 | 0 | 1 | 0 | | | | | | | | | | | | | | | | | |
| 3 | | D3 | 1 | | | | | | | | | 1 | 1 | 1 | 0 | 0 | 1 | 1 | 0 | | | | | | | | | |
| | 4 | | | 1 | 0 | 1 | 0 | 0 | 1 | 0 | 1 | | | | | | | | | | | | | | | | | |
| 4 | | D4 | 0 | | | | | | | | | 1 | 1 | 1 | 0 | 0 | 0 | 1 | 1 | 0 | | | | | | | | |
| | 5 | | | 1 | 1 | 0 | 1 | 0 | 0 | 1 | 0 | | | | | | | | | | | | | | | | | |
| 5 | | D5 | 0 | | | | | | | | | 1 | 1 | 1 | 0 | 0 | 0 | 0 | 1 | 1 | 0 | | | | | | | |
| | 6 | | | 0 | 1 | 1 | 0 | 1 | 0 | 0 | 1 | | | | | | | | | | | | | | | | | |
| 6 | | D6 | 1 | | | | | | | | | 0 | 1 | 1 | 1 | 1 | 1 | 0 | 0 | 1 | 1 | 0 | | | | | | |
| | 7 | | | 0 | 0 | 1 | 1 | 1 | 1 | 0 | 0 | | | | | | | | | | | | | | | | | |
| 7 | | D7 | 1 | | | | | | | | | 1 | 0 | 1 | 1 | 0 | 1 | 1 | 0 | 0 | 1 | 1 | 0 | | | | | |
| | 8 | | | 1 | 0 | 0 | 1 | 0 | 1 | 1 | 0 | | | | | | | | | | | | | | | | | |
| 8 | | D8 | 0 | | | | | | | | | 1 | 0 | 1 | 1 | 0 | 0 | 1 | 1 | 0 | 0 | 1 | 1 | 0 | | | | |
| | 9 | | | 0 | 1 | 0 | 0 | 1 | 0 | 1 | 1 | | | | | | | | | | | | | | | | | |
| 9 | | D9 | 0 | | | | | | | | | 1 | 0 | 1 | 1 | 0 | 0 | 0 | 1 | 1 | 0 | 0 | 1 | 1 | 0 | | | |
| | 10 | | | 0 | 0 | 1 | 0 | 1 | 1 | 0 | 1 | | | | | | | | | | | | | | | | | |
| 10 | | D10 | 1 | | | | | | | | | 0 | 1 | 1 | 0 | 1 | 1 | 0 | 0 | 1 | 1 | 0 | 0 | 1 | 1 | 0 | | |
| | 11 | | | 0 | 0 | 0 | 1 | 1 | 1 | 1 | 0 | | | | | | | | | | | | | | | | | |
| 11 | | P1 | 1 | | | | | | | | | 1 | 0 | 0 | 0 | 0 | | | | | | | | | | | | |
| | 12 | | | 1 | 0 | 0 | 0 | 0 | 1 | 1 | 1 | | | | | | | | | | | | | | | | | |
| 12 | | P2 | 0 | | | | | | | | | 1 | 0 | 0 | 0 | 0 | | | | | | | | | | | | |
| | 13 | | | 1 | 1 | 0 | 0 | 0 | 0 | 1 | 1 | | | | | | | | | | | | | | | | | |
| 13 | | P3 | 1 | | | | | | | | | 1 | 0 | 1 | 1 | 1 | | | | | | | | | | | | |
| | 14 | | | 1 | 1 | 1 | 0 | 0 | 0 | 0 | 1 | | | | | | | | | | | | | | | | | |
| 14 | | P4 | 1 | | | | | | | | | 1 | 0 | 1 | 0 | 0 | | | | | | | | | | | | |
| | 15 | | | 1 | 1 | 1 | 1 | 0 | 0 | 0 | 0 | | | | | | | | | | | | | | | | | |
| 15 | | P5 | 0 | 1 | 0 | 0 | 0 | 0 | 1 | 1 | 1 | 0 | 1 | 0 | 1 | 0 | 1 | 2 | 3 | 4 | 5 | 6 | 7 | 8 | 9 | 10 | C | |
| | | | | | | | | | | | | | | | | | 1 | 0 | 0 | 1 | 1 | 0 | 0 | 1 | 1 | 0 | | |
| | 1 | | | 1 | 1 | 0 | 0 | 0 | 0 | 1 | 1 | | | | | | | 1 | 0 | 0 | 1 | 1 | 0 | 0 | 1 | 1 | 0 | |
| | 2 | | | 1 | 1 | 1 | 0 | 0 | 0 | 0 | 1 | | | | | | | | 1 | 0 | 0 | 1 | 1 | 0 | 0 | 1 | 1 | 0 |
| | 3 | | | 1 | 1 | 1 | 1 | 0 | 0 | 0 | 0 | | | | | | | | | 1 | 0 | 0 | 1 | 1 | 0 | 0 | 1 | 1 |
| | 4 | | | 0 | 1 | 1 | 1 | 1 | 0 | 0 | 0 | | | | | | | | | | 1 | 0 | 0 | 1 | 1 | 0 | 0 | 1 |
| | 5 | | | 1 | 0 | 1 | 0 | 0 | 1 | 0 | 0 | | | | | | | | | | | 1 | 0 | 0 | 1 | 1 | 0 | 0 |
| | 6 | | | 0 | 1 | 0 | 1 | 1 | 0 | 1 | 0 | | | | | | | | | | | | 1 | 0 | 0 | 1 | 1 | 0 |
| | 7 | | | 1 | 0 | 1 | 0 | 0 | 1 | 0 | 1 | 0 | 1 | 0 | 1 | | COMPARE CORRECT | | | | | | | 1 | 0 | (1) | (1) | 1 |
| | 8 | | | 1 | 1 | 0 | 1 | 1 | 1 | 0 | 1 | 0 | 0 | 0 | 0 | | | | | | | | | | 1 | 0 | 1 | 0 |
| | 9 | | | 0 | 1 | 1 | 0 | 0 | 1 | 1 | 0 | | | | | | | | | | | | | | | 1 | 0 | 1 |
| | 10 | | | 0 | 0 | 1 | 1 | 1 | 1 | 0 | 0 | | | | | | | | | | | | | | | | 1 | 0 |
| | 11 | | | 1 | 0 | 0 | 1 | 0 | 1 | 1 | 0 | | | | | | 0 | 0 | 0 | 0 | 0 | 0 | 0 | 0 | 0 | 0 | 0 | 1 |
| | 12 | | | 0 | 1 | 0 | 0 | 1 | 0 | 1 | 1 | | | | | | | | | | | | | | | | | |
| | 13 | | | 0 | 0 | 1 | 0 | 1 | 1 | 0 | 1 | | | | | | | | | | | | | | | | | |
| | 14 | | | 0 | 0 | 0 | 1 | 1 | 1 | 1 | 0 | | | | | | | | | | | | | | | | | |
| | 15 | | | 1 | 0 | 0 | 0 | 0 | 1 | 1 | 1 | 0 | 1 | 0 | 1 | | | | | | | | | | | | | |
| | | | | 1 | 1 | 1 | 1 | 0 | 0 | 0 | 0 | 0 | 1 | 0 | 1 | 0 | 0 | 0 | 0 | 0 | 0 | 0 | 0 | 0 | 0 | 0 | | |
| Co RESET | | | | 1 | 1 | 1 | 1 | 0 | 0 | 0 | 0 | 0 | 0 | 0 | 0 | 0 | – | – | – | – | – | – | – | – | – | – | | |

FIG. 7

United States Patent Office 3,163,848
Patented Dec. 29, 1964

3,163,848
DOUBLE ERROR CORRECTING SYSTEM

Norman M. Abramson, Woodside, Calif., assignor to International Business Machines Corporation, New York, N.Y., a corporation of New York Filed Dec. 22, 1959, Ser. No. 861,268
13 Claims. (Cl. 340—146.1)

This invention relates in general to systems for detecting, locating and correcting errors in a binary code group consisting of parity bits and data bits, and in particular to a system for detecting, locating and correcting two types of related errors in an information code group wherein the bit positions checked by each parity bit are determined in accordance with a systematic arrangement.

Various arrangements have been suggested in the prior art for checking coded information which has been translated between two points. These arrangements may be classified generally as either error detecting arrangements or error correcting arrangements. An example of an error detecting arrangement is the now well known parity check arrangement in which a partity bit position is added to the data bit positions of a binary code group. In this arrangement the binary value of the parity bit is chosen so that each code group has an even number of binary 1 bits. A similar known arrangement employs the same concept except that the value of the parity bit is chosen so as to provide an odd number of binary 1 bits in each code group. Such arrangements are, of course, limited to the function of merely detecting the presence of an odd number of errors. They cannot detect an even number of errors, and they cannot locate or correct any errors.

An example of an error correcting system known in the prior art is represented by the system disclosed by Hamming, et al. in U.S. Reissue 23,601 (U.S. 2,552,629). The theory of the Hamming code for single error correction may be readily understood by an analysis of the so-called parity check table. A parity check table corresponding to Table 2 in the above-mentioned reissued patent is reproduced below as Table 1 for convenience.

*Table 1*

| Parity Bit | Locator Subword | Code Group Position | | | | | | |
|---|---|---|---|---|---|---|---|---|
| | | $k_1$ | $k_2$ | $k_3$ | $D_1$ | $D_2$ | $D_3$ | $D_4$ |
| | | 1 | 2 | 3 | 4 | 5 | 6 | 7 |
| 1 | $k_1'$ | X | | | X | X | | X |
| 2 | $k_2'$ | | X | | X | | X | X |
| 3 | $k_3'$ | | | X | | X | X | X |

In the example represented by the above table a code group of seven bit positions is assumed, $D_1$–$D_4$ representing data bit positions, and $k_1$–$k_3$ representing parity bit positions. This table is a convenient way to indicate that parity bit $k_1$ checks bit positions of the code group indicated by an X; that is, $k_1$ checks bit positions 1, 4, 5 and 7; parity bit $k_2$ checks bit positions 2, 4, 6 and 7; and parity bit $k_3$ checks bit postions 3, 5, 6 and 7.

When the code group is received some of the bits may be in error. At the receiver three more bits $k_1'$–$k_3'$ (comprising the locator subword) are computed. The parity check bit $k_1'$ will be equal to zero if parity bit $k_1$ of the received code group satisfies its parity check and equal to one if parity bit $k_1$ of the received code group does not satisfy its parity check. Parity check bits $k_2'$ and $k_3'$ depend on $k_2$ and $k_3$ of the received code group in the same manner.

If the code group of seven bits is translated correctly, $k_1'$–$k_3'$ will all be 0 assuming an even parity check. However, if one bit of the translated code group is received in error the locator subword $k_1'$–$k_3'$ (referred to by Hamming as the parity subgroup) will not be all 0's and, hence, a single error is readily detected. The partcular bit position in which the detected error is located is indicated by the condition of the locator subword $k_1'$–$k_3'$.

The locator words and the respective bit positions which they indicate are in error are tabulated below in Table 2 for convenience, and correspond to Table 4 in the above mentioned reissued patent.

*Table 2*

| Error in Bit Position | Locator Subword | | |
|---|---|---|---|
| | $k_3'$ | $k_2'$ | $k_1'$ |
| $k_1$ | 0 | 0 | 1 |
| $k_2$ | 0 | 1 | 0 |
| $k_3$ | 1 | 0 | 0 |
| $D_1$ | 0 | 1 | 1 |
| $D_2$ | 1 | 0 | 1 |
| $D_3$ | 1 | 1 | 0 |
| $D_4$ | 1 | 1 | 1 |
| No errors | 0 | 0 | 0 |

The above table, referred to as the locator subword table, is based on the following reasoning and may be construed by reference to the parity check Table 1. To locate a particular bit position whose value has been received in error a reception, parity check must be made over the same selected bit positions used in initially determining the value of each parity bit $k_1$–$k_3$. If a correct parity is received over the selected bit positions associated with each of the parity bits the locator subword $k_1'$–$k_3'$ is all 0's. If an error occurs in bit position 1, $k_1'$ is affected and becomes a 1, while $k_2'$ and $k_3'$ are not affected since these parity bits do not check bit position 1. Hence, the locator subword for an error bit in bit position 1 is 100. Similarly, the locator subword for an error in bit position 2 is 010, and for an error in bit position 3, 001. An error in bit position 4 affects both $k_1'$ and $k_2'$, and hence the locator subword for an error in this bit position becomes 110. Similar reasoning may be employed to show that single error in bit positions 5, 6 and 7 result in the locator subword shown in Table 2. The obtaining of different locator subwords for indicating the bit position where a single error occurs is the basic concept on which the Hamming error-correcting system is based.

As explained by Hamming the parity check table for a single error correcting system satisfies two conditions. The first is that each bit position of the code group must be in a locator subword. The second is that the locator subword $k_1'$–$k_3'$ for each bit position of the code group must be different.

In many circumstances it is desirable to transmit a code group which has a relatively large number of bit positions. The main reasons for having a large number of bit positions is that the efficiency of a data transfer operation is greatly increased. For example, in a seven bit code group the ratio of redundant data to useful data is 3-to-4, while in a code group having 127 bit positions to radio becomes 7-to-120. In providing a system that will generate seven parity bits from 127 bit postions with each parity bit checking a particular group of bit positions in the 127 bit positions, a very complex arrangement for assigning particular bit positions to a group arises unless some systematic approach is followed in the assignment process.

In order to simplify the assignment operation the prior art has suggested that another condition be added to the two conditions set forth in the Hamming reissued patent for construction of a systematic parity check table. This other condition allows the basic concept of the Hamming parity check table to follow a systematic approach when it is extended to code groups having a relatively large number of bit positions. This third condition is illustrated in the parity check table below, Table 3, and may be stated as follows; a series of binary digits, which form the locator subword for any bit position of the code group, define the number of the bit position in the code group when it is considered as a conventional binary number.

*Table 3*

| Parity Bits | 1 | 2 | 3 | 4 | 5 | 6 | 7 | 8 | 9 | 10 | 11 | 12 | 13 | 14 | 15 | Binary Order |
|---|---|---|---|---|---|---|---|---|---|---|---|---|---|---|---|---|
| | $D_1$ | $D_2$ | $D_3$ | $D_4$ | $D_5$ | $D_6$ | $D_7$ | $D_8$ | $D_9$ | $D_{10}$ | $D_{11}$ | $P_4$ | $P_3$ | $P_2$ | $P_1$ | |
| $P_1$ | X | | X | | X | | X | | X | | X | | X | | X | 1 |
| $P_2$ | | X | X | | | X | X | | | X | X | | | X | X | 2 |
| $P_3$ | | | | X | X | X | X | | | | | X | X | X | X | 4 |
| $P_4$ | | | | | | | | X | X | X | X | X | X | X | X | 8 |

It will be seen from the above table that a locator subword for any bit position in the code group is the binary equivalent of that position. For example, the locator subword for bit position 5 is 1010, and the locator subword for bit position 13 is 1011, which (when read from left to right) are the binary equivalents of 5 and 13, respectively. Following a systematic approach in the construction of the parity check table results in a simplification of the parity bit assignment process in that a conventional binary counter may be employed in the system for generating grating signals, which allow a particular group of bit positions to be checked by the respective parity bits. In the example above it will be seen that the parity bit $P_1$ is assigned to check the group of bit positions consisting of $D_1$, $D_3$, $D_5$, $D_7$, $D_9$, $D_{11}$, $P_3$ and $P_1$. The output signal from the first stage of the conventional four stage binary counter would provide the necessary gating signals to allow the appropriate bit positions to be checked by parity bit $P_1$. Similarly, the output signal of the second, third and fourth stages would provide the correct gating signals to allow the appropriate bit positions to be checked by parity bits $P_2$, $P_3$, and $P_4$, respectively.

While systematizing the parity check table in the above described manner results in simplification of the parity bit assignment process it creates the need for additional circuitry in that at least one of the particular parity bits also checks a bit position of the code group which contains another parity bit at a time when the condition of the parity bit to be checked is not final. For example, in the systemized parity check table above the group of parity bits checked by $P_1$ include parity bit positions 13 and 15 of the code group which are reserved for parity bits $P_3$ and $P_1$. However, if the code group is to be transmitted in a serial by bit fashion, $P_1$ cannot be transmitted in its proper sequence, since its final value cannot be determined until $P_3$ is determined. It can be shown that systemizing the parity check table in accordance with the above described process prevents the transmission of the data bits and the parity bits in a natural occurring sequence. Stated somewhat differently, single error correcting systems known in the prior art cannot achieve the simplicity of circuitry obtained by systemizing the assignment of the bit positions to be checked, and at the same time, maintain the simple circuitry obtained under the conditions where the assignment process is not systemized.

Copending application Serial No. 861,267, now Patent No. 3,114,130, filed concurrently herewith and assigned to the assignee of the present invention, discloses a single error correction system which maintains the advantages of a systematic assignment of the bit positions to be checked by each of the parity bits, while still allowing the data bits and the parity bits to be transmitted in their proper order. The concept underlying that system may be seen by reference to the parity check table below, designated Table 4.

*Table 4*

| | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| | $D_1$ | $D_2$ | $D_3$ | $D_4$ | $D_5$ | $D_6$ | $D_7$ | $D_8$ | $D_9$ | $D_{10}$ | $D_{11}$ | $P_1$ | $P_2$ | $P_3$ | $P_4$ |
| $P_1$ | X | X | X | X | | X | | X | X | | | X | | | |
| $P_2$ | | X | X | X | X | | X | | X | X | | | X | | |
| $P_3$ | | | X | X | X | X | | X | | X | X | | | X | |
| $P_4$ | | | | X | X | X | X | | X | | X | X | | | X |

In the system disclosed by the above mentioned copending application the bit positions to be checked by parity bit $P_1$ are determined in accordance with an m-sequence. The term m-sequence is known in the art and may be defined by the output signal of one stage of a maximal length binary shift register having R stages. An m-sequence is merely a series of 0's and 1's of $2^R-1$ binary digits arranged in a predetermined order. A true m-sequence satisfies the condition that:

$$a_{t+R}=\sum_{j=1}^{j=R} C_j a_{t+(j-1)} \quad (1)$$

where $2^R-1$ is the number of binary digits in the sequence before it repeats itself and the symbol $a_t$ is employed to designate the value of the first binary digit in the sequence; $a_{t+1}$ the value of the secondary binary digit in the sequence; $a_{t+2}$ the value of the third binary digit in the sequence; etc. The above equation may also be expressed as:

$$a_{t+R}=C_1a_t+C_2a_{t+1}+C_3a_{t+2}+ \ldots +C_Ra_{t+R-1} \quad (2)$$

where $C_1$–$C_R$ each represent a binary coefficient 0 or 1 determined from reference tables referred to as a "Table of Irreducible Polynominals Over Galois Field (2) Through Degree 19," by R. W. Marsh, a publication of the National Security Agency, dated October 24, 1957. Coefficients $C_1$–$C_R$ in effect determine the feedback path of the maximal length binary shift register.

The number of different m-sequences that are obtained from an R stage maximal length binary shift register is tabluated below:

| | | | | | | | | | |
|---|---|---|---|---|---|---|---|---|---|
| Number of Stages | R=2 | 3 | 4 | 5 | 6 | 7 | 8 | 9 | 10 |
| Different m-sequences | 1 | 2 | 2 | 6 | 6 | 18 | 16 | 48 | 60 |

The number of different m-sequences obtained from an R-stage m-sequence generator also corresponds to the number of different groups of coefficients $C_1$–$C_R$ which are available for m-sequences.

From the above table it will be seen that two different m-sequences may be obtained from a four-stage maximal length linear binary shift register. When $C_1$–$C_R$ correspond respectively to 1100, the following m-sequence is obtained:

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 1 | 0 | 0 | 1 | 1 | 0 | 1 | 0 | 1 | 1 | 1 | 1 | 0 | 0 | 0 |

When $C_1-C_R$ is 1001 the other m-sequence is obtained:

| 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|
| 1 | 1 | 1 | 1 | 0 | 1 | 0 | 1 | 1 | 0 | 0 | 1 | 0 | 0 | 0 |

With relation to the general Equation 1 for an m-sequence, the first sequence shown above is expressed specifically as $a_{t+4}=a_t+a_{t+1}$. In the nonmathematical language this specific equation expresses the fact that the value of the fifth binary digit $(a_{t+4})$=the mod. 2 sum of the values of the first binary digit $(a_t)$ and second binary digit $(a_{t+1})$. For example, the fifth digit in the m-sequence (1) is obtained by binary addition (mod. 2) of the first digit (1) and the second digit (0). The following digits of the m-sequence are obtained in the same manner until $2^R-1$ (15) digits are obtained. The m-sequence then repeats itself.

The second m-sequence is obtained in a similar manner, but since the coefficients $C_1-C_R$ are different, 1001, the specific equation becomes $a_{t+4}=a_t+a_{t+3}$. In other words the value of the first digit plus the value of the fourth digit will give the value of the fifth digit.

Referring again to Table 4, which is the parity check table employed in connection with the single error correction system disclosed in the above mentioned copending application, if an X is replaced by a 1 and a blank by a 0 in each of the rows $P_1-P_4$ of the table, it will be seen that the sequences of 0's and 1's follow the m-sequence defined in line 7, column 5, where coefficient $C_1-C_4$ correspond to 1001. The row designated $P_1$ in Table 4 corresponds exactly to the m-sequence in line 9, page 8. The succeeding rows are merely shifted one position to the right. The output signals of the first stage of a four-stage maximal length binary shift register would provide the necessary gating signals to allow the appropriate bit positions to be checked by $P_1$. Similary, the second, third and fourth stages of the shift register would provide the necessary gating signals to allow the appropriate bit positions to be checked by paritiy bits $P_2$, $P_3$ and $P_4$, respectively.

The assignment of the bit positions to be checked by each parity bit follows a systematic approach, and hence the assignment operation is readily implemented in the error correcting system. In addition, since each of the parity bits are in a final state at the time they are to be transmitted the parity bits may be transmitted sequentially following the data bits in a serial by bit fashion without interruption.

However, the system disclosed in the above mentioned copending application is limited to the correction of a single error in a code group. It cannot detect or correct errors which occur in more than one bit position of the code group.

While the Hamming reissued patent mentioned previously discloses a system which corrects single errors and detects double errors, it has the same disadvantages as the similar single error correcting system. The parity check table for the Hamming system which corrects single errors and detects double errors is shown in Table 5 below.

*Table 5*

| Parity Bit | Locator Subword | Code Group Position | | | | | | | |
|---|---|---|---|---|---|---|---|---|---|
| | | $k_1$ | $k_2$ | $k_3$ | $D_1$ | $D_2$ | $D_3$ | $D_4$ | $k_4$ |
| | | 1 | 2 | 3 | 4 | 5 | 6 | 7 | 8 |
| 1 | $k'_1$ | X | | | X | X | | X | |
| 2 | $k'_2$ | | X | | X | | X | X | |
| 3 | $k'_3$ | | | X | | X | X | X | |
| 4 | $k'_4$ | X | X | X | X | X | X | X | X |

The parity check table shown in Table 5 is identical to the parity check table shown in Table 1, except for the addition of an eighth bit position to the code group, and the $k_4$ parity bit. Parity bits $k_1$, $k_2$ and $k_3$ check the same bit positions as in Table 1. The $k_4$ parity bit referred to as the "all check parity bit" checks each of the eight bit positions.

The locator subwords (which correspond to Hamming's parity subgroups) for errors in particular bit positions are tabulated below in Table 6, and correspond to Table 6 of the reissued patent.

*Table 6*

| Error in Bit Position | Locator Subword | | | |
|---|---|---|---|---|
| | $k_4$ | $k_3$ | $k_2$ | $k_1$ |
| $k_1$ | 1 | 0 | 0 | 1 |
| $k_2$ | 1 | 0 | 1 | 0 |
| $k_3$ | 1 | 1 | 0 | 0 |
| $D_1$ | 1 | 0 | 1 | 1 |
| $D_2$ | 1 | 1 | 0 | 1 |
| $D_3$ | 1 | 1 | 1 | 0 |
| $D_4$ | 1 | 1 | 1 | 1 |
| $k_4$ | 1 | 0 | 0 | 0 |
| Two errors | 0 | (*) | (*) | (*) |
| No errors | 0 | 0 | 0 | 0 |

*1, 2 or all of $k_1$, $k_2$ and $k_3$ will have a 1 value.

If there are no errors in a code group after it is translated, all of the parity bits $k_1-k_4$ will be satisfied and the locator subword will be 0000. When a single error occurs in any bit position of the code group two separate indications are obtained. First, the all check parity bit $k_4$ will not be satisfied, and therefore $k_1'$ becomes a 1 indicating a single error. Second, the $k_1-k_3$ parity bits of the locator subword will indicate the location of the single error, the 000 value of $k_1'-k_3'$ now indicating an error in the eighth bit position of the code group. If, on the other hand, two errors have occurred the all check parity bit $k_4$ is satisfied, but at least one of the parity bits $k_1$, $k_2$ or $k_3$ will not be satisfied. Stated somewhat differently, it can be determined by reference to Table 4, if a single error has been made by looking at the locator subword consisting of $k_1'-k_4'$ parity check bits. If the locator subword is not all 0's a single or double error may be assumed. If the $k_4'$ parity check bit is a 1, this indicates a single error, and parity check bits $k_1'-k_3'$ indicate the bit position in the code group where the single error has occurred. If, on the other hand, parity check bit $k_4'$ is 0 and one or more of the parity check bits $k_1-k_3'$ are 1, this indicates that two errors have been made, but no information is available from the locator subword table as to the location of the two errors. This system is therefore referred to as a single error correcting-double error detecting system (SEC-DED). It cannot correct double adjacent errors.

The present invention discloses an arrangement for correcting both single errors and double adjacent errors. The concept underlying the present invention may be seen by reference to the parity check table, shown below as Table 7, employing a code group of seven bit positions consisting of four parity bit positions and three data bit positions.

*Table 7*

| Parity Bit | Locator Subword | Code Group Position | | | | | | |
|---|---|---|---|---|---|---|---|---|
| | | $D_1$ | $D_2$ | $D_3$ | $P_1$ | $P_2$ | $P_3$ | $P_0$ |
| | | 1 | 2 | 3 | 4 | 5 | 6 | 7 |
| 1 | $P_1$ | X | X | | X | | | |
| 2 | $P_2$ | | X | X | | X | | |
| 3 | $P_3$ | | | X | X | | X | |
| 4 | $P_0$ | X | X | X | X | X | X | X |

Table 7 is similar in form to the parity check table disclosed by Hamming except for a change in notation. $P_1$–$P_3$ and $P_0$ correspond respectively to the parity bit notations $k_1$–$k_4$ employed by Hamming. The above table indicates that:

$P_1$ checks bits positions 1, 2 and 4 ($D_1$, $D_2$ and $P_1$)
$P_2$ checks bit positions 2, 3 and 5 ($D_2$, $D_3$ and $P_2$)
$P_3$ checks bit positions 3, 4, and 6 ($D_3$, $P_1$ and $P_3$)
$P_0$ checks bit positions 1 through 7 ($D_1$ through $P_0$)

The main distinguishing feature between the Abramson parity check table, as shown in Table 7, and the parity check table disclosed by Hamming (Table 5), is that the bit positions checked by each parity bit $k_1$–$k_4$ in the Hamming table are arranged arbitrarily, while in the present invention the bit positions checked by a parity bit are determined under the control of an m-sequence, specifically in accordance with the complement of the m-sequence. The bit positions checked by parity bit $P_1$ in the present arrangement are shown below in Table 8 in relation to the m-sequence for a three-stage m-sequence generator, and also in relation to the complement of the true m-sequence.

*Table 8*

| Bit position | 1 | 2 | 3 | 4 | 5 | 6 | 7 |
|---|---|---|---|---|---|---|---|
| | $D_1$ | $D_2$ | $D_3$ | $P_1$ | $P_2$ | $P_3$ | $P_0$ |
| $P_1$ | X | X | 0 | X | 0 | 0 | 0 |
| m-sequence for $R=3$ | 0 | 0 | 1 | 0 | 1 | 1 | 1 |
| Complemented m-sequence | 1 | 1 | 0 | 1 | 0 | 0 | 0 |

It will be noted that parity bit $P_1$ checks that bit positions indicated by the binary 1 bits of the complemented m-sequence in the last line. It will also be noted from Table 7 that parity bit $P_2$ checks bit positions corresponding to the same complemented m-sequence shifted to the right by one position relative to parity bit $P_1$, and that $P_3$ checks bits positions corresponding to the same complemented m-sequence shifted to the right by one bit position relative to parity bit $P_2$.

The fact that the bit positions checked follow an inverse m-sequence results in a systematic assignment of the bit positions to be checked by each parity bit and hence a fairly simple error correction system is provided. In addition to this simplification of the system the arrangement of the parity check table allows correction of double adjacent errors in that errors in successive pairs of bit positions (1 and 2, 2 and 3, 3 and 4, etc.) cause a group of locator subwords to be generated whose complements correspond to the complemented m-sequence shifted a fixed amount relative to the condition of the original complemented m-sequence. This is shown in Table 9 below.

*Table 9*

| 1<br>True M-Sequence | 2<br>Complement of True M-Sequence | 3<br>Locator Subword Error in Bit Position |
|---|---|---|
| 0 1 1 | 1 0 0 | 1  1 0 0 |
| 0 0 1 | 1 1 0 | 2  1 1 0 |
| 1 0 0 | 0 1 1 | 3  0 1 1 |
| 0 1 0 | 1 0 1 | 4  1 0 1 |
| 1 0 1 | 0 1 0 | 5  0 1 0 |
| 1 1 0 | 0 0 1 | 6  0 0 1 |
| 1 1 1 | 0 0 0 | 7  0 0 0 |

| 4<br>Locator Subword Error in Bit Position | 5<br>Complement of Locator Subwords for 11 Type Error |
|---|---|
| 1–2  0 1 0 | 1–2  1 0 1 |
| 2–3  1 0 1 | 2–3  0 1 0 |
| 3–4  1 1 0 | 3–4  0 0 1 |
| 4–5  1 1 1 | 4–5  0 0 0 |
| 5–6  0 1 1 | 5–6  1 0 0 |
| 6–7  0 0 1 | 6–7  1 1 0 |
| 7–1  1 0 0 | 7–1  0 1 1 |

The locator subwords for double adjacent errors have been obtained by binary addition of the locator subwords for single errors in the affected bit positions. For example, the locator subword for a double adjacent error in bit positions 1 and 2 is 010, obtained by adding modulo 2, the locator subword for a single error in bit position 1, (100) to the locator subword for a single error in bit position 2 (110). The complement of the locator subword for a double adjacent error in bit positions 1 and 2 is therefore 101. Table 9 shows that the complement of each locator subword for a double adjacent error corresponds to the locator subword for a single error starting in another bit position. For example, a single error in bit position 2 has the locator subword 110 ($P_1$, $P_2$, and $P_3$). The complement of the locator subword generated by a double adjacent error in bit positions 6 and 7 is also 110. This is a shift of four positions between the two columns 3 and 5. It can be shown that the four positional shift relationship is maintained for all the bit positions of the code group and this may be verified by Table 9. Since the locator subword tables for both single and double adjacent errors are related, they may be generated quite simply by the same maximal length binary shift register.

In accordance with the present invention the improved error correcting system comprises an encoder and a decoder which are interconnected by a suitable signal translating means. The encoder comprises generally means for generating a plurality of parity bits from bit positions of the code group which are selected under the control of an m-sequence generator and an all check parity bit, from each bit position of the code group, and means for controlling the translation of the parity bits sequentially following the data bits.

The detector comprises generally means for generating a plurality of reception parity bits from bit positions of the code group which are selected under the control of an m-sequence generator and an all check parity bit, from each bit position of the code group, means responsive to the generated reception parity bits for detecting if an error occurred, means responsive to the all check parity bit for determining the type of error, means under the control of the generated parity bits and the all check parity bit for locating the detected error and means under the control of the locating means and the all check parity bit for correcting the error.

It is therefore an object of the present invention to provide an improved system for correcting multiple errors in a binary code group.

Another object of the present invention is to provide a system which is operable to correct either single or double adjacent errors in a transmitted code group consisting of data bit positions and parity bit positions.

A further object of the present invention is to provide a single and double error correcting system in which the bit positions of the code group to be checked by each of the parity bits are assigned systematically in accordance with a complemented m-sequence.

The foregoing and other objects, features and advantages of the invention will be apparent from the following more particular description of a preferred embodiment of the invention, as illustrated in the accompanying drawings.

In the drawings:

FIG. 3 is a chart illustrating the operation of the encoder shown in FIG. 2;

FIG. 5 is a chart illustrating the operation of the decoder when the translated code group has been received correctly;

FIG. 6 is a chart illustrating the operation of the decoder when the translated code group as received contains a single error; and FIG. 7 is a chart illustrating the operation of the decoder when the translated code group as received contains a double adjacent error.

Figures 1, 1A:
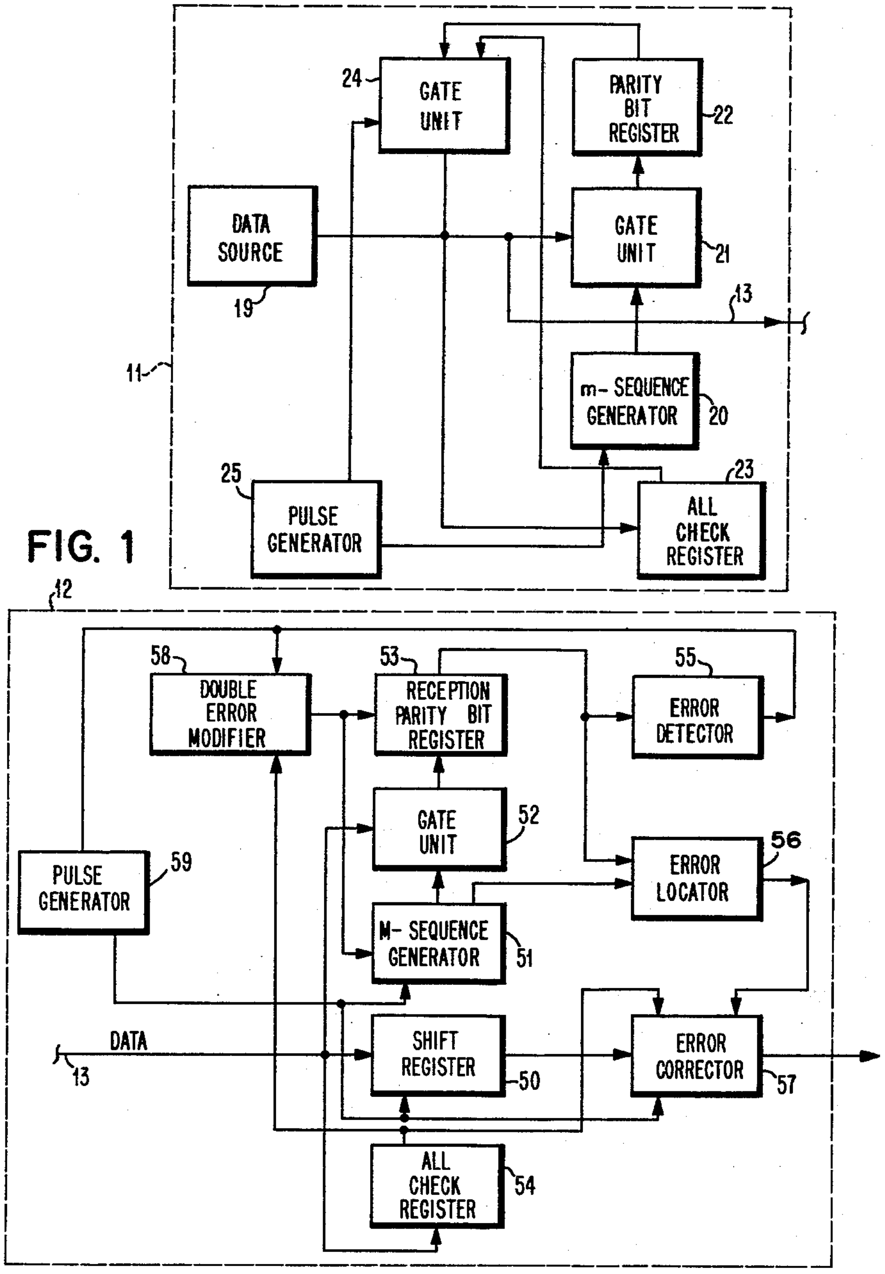
FIG. 1 is a block diagram of an error correcting system embodying the present invention.
FIG. 1A is a parity check table for the fifteen bit code group employed in the illustrated example.

Referring to the drawings, and particularly to FIG. 1, the error correcting system illustrated therein in block form comprises an encoder 11 and a decoder 12, which are interconnected by a suitable signal translating means 13.

The data translating means 13 interconnecting the encoder 11 and decoder 12 may take several forms, depending on the particular application involved. For example, the translating means 13 may represent either a commercial telephone link or a radio telephone link connecting one of a plurality of remote input stations to a centrally located data processing center, in which event the encoder 11 of the error correcting system is located in proximity with the remote input station and the decoder 12 is associated with the central data processing center. In another practical application, the data source and the utilization device may both be physically located in the same data processing unit, in which event the data translating means 13 interconnecting the encoder 11 and decoder 12, would employ in its simplest form a single conductor.

In the latter application, certain functional components common to both the encoder and the decoder could be eliminated in either the encoder or the decoder. However, since the first arrangement employing the encoder and the decoder at remote points lends itself to a more straightforward explanation of the system, the invention is illustrated and described as embodied in this arrangement. It is assumed that the system operates on a code group having fifteen positions consisting of ten data bit positions and five parity bit positions. However, any code group length may be employed if desired.

As shown in FIG. 1 the encoder is connected to a source 19 of data which supplies binary coded data signals to the encoder in groups, each of which consist of ten bit positions. The encoder functions to generate five parity bits, and, hence, transmits a code group consisting of the original ten data bits followed by the five parity bits to the decoder 12.

The encoder as shown in FIG. 1 comprises generally an m-sequence generator 20, a gate unit 21, a parity bit register 22, an all check parity bit register 23, a gate unit 24 and a pulse generator 25. The ten data bits are supplied sequentially to gate unit 21 and the all check parity bit register 23. Gate unit 21 is conditioned by the signals from the m-sequence generator 20 so that each parity bit generated by register 23 checks bit positions of the fifteen bit code group as designated by an X in the parity check table of FIG. 1A, which corresponds to a complemented m-sequence. Gate unit 24 is conditioned by the pulse generator 25 to allow the generated parity bits and the all check parity bit to be supplied to the data-out line 13 in the proper order following the ten data bits.

Figure 2:
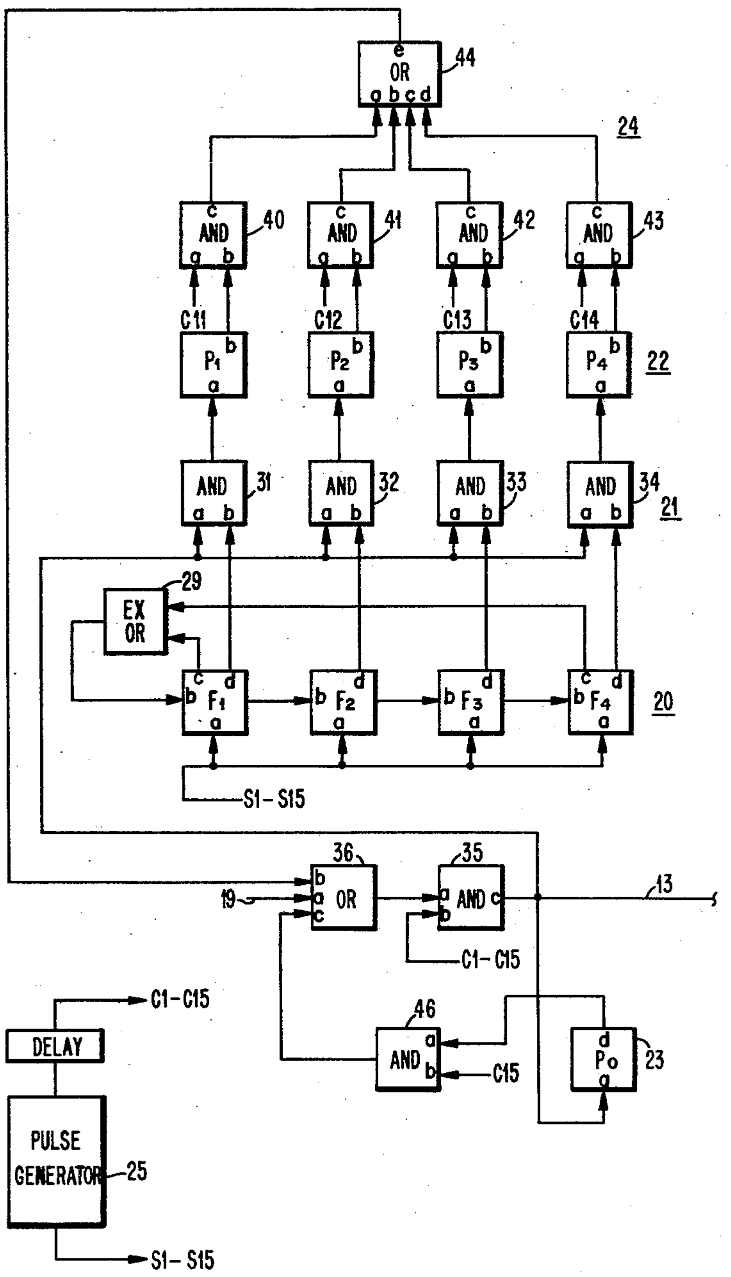
FIG. 2 is a diagrammatic view of the encoder shown in block form in FIG. 1.

The details of the encoder are shown in FIG. 2. With reference to FIG. 2, the m-sequence generator 20, as shown, comprises four stages $F_1$–$F_4$, each of which has an input terminal $a$, connected to the pulse generator 25. M-sequence generator 20 is saimilar to a conventional shift register, except that a feedback path is established from output taps $c$ of stages $F_4$ and $F_1$ back to an input tap $b$ of stage $F_1$ through exclusive OR circuit 29. The output terminals $d$ of the m-sequence generator 20 are connected to the gate unit 21.

Gate unit 21 comprises four similar conventional AND gates 31–34. Each AND gate has an input tap $b$ which is connected to the respective output taps $d$ of stages $F_1$–$F_4$ of generator 20. The other input taps $a$ of AND gates 31–34 are connected in parallel to the output tap $c$ of AND gate 35. AND gate 35 has one input tap $a$, connected to the data source 19 through OR gate 36, and an input tap $b$, connected to the pulse generator 25. The output tap $c$ of AND gates 31–34 are connected to the parity bit register 22.

Parity bit register 22 as shown comprises four stages $P_1$–$P_4$. Any suitable bistable device known in the art may be employed as one of the stages. For example, each stage may consist of an Eccles-Jordan trigger or flip-flop which changes from one stable state to another in response to successive pulses applied to an input tap $a$. In one stable state output tap $b$ is in a low state indicating a 0, and in the other stable state output tap $b$ is in a high state indicating a 1 condition. Taps $b$ of stages $P_1$–$P_4$ are connected to the data-outline through gate unit 24, OR circuit 36 and AND gate 35.

Gate unit 24 comprises four conventional AND gates 40–43 which have their output taps $c$ connected to the four input taps $a$–$d$ of OR gate 44. The input taps $b$ of AND gates 40–43 are connected to the output taps $b$ of the stages $P_1$–$P_4$, respectively. The other input taps $a$ of AND gates 40–43 are connected to the pulse generator 25 and are supplied with pulses C11–C14, respectively. Output tap $e$ of OR gate 44 is connected to input tap $b$ of OR gate 36.

Encoder 11 further includes the all check parity bit register which consists of a single stage $P_0$ having an input tap $a$ connected to output tap $c$ of AND gate 35. Stage $P_0$ is similar to stages $P_1$ and $P_4$ and may comprise a conventional trigger. Output tap $d$ of stage $P_0$ is connected to the data-out line 13 through AND gate 46, OR gate 36 and AND gate 35; input tap $b$ of AND gate 46 being connected to the pulse generator 25 for receiving clock pulse C15.

The operation of the encoder may be seen by reference to FIG. 3. It is assumed that the m-sequence generator 20 and the parity bit register 22 are in the condition shown on line 1 of the chart of FIG. 3, and that the ten bits of data $D_1$–$D_{10}$ are supplied from the data source in the order shown in the third column of the chart. The fourth column $F_1$–$F_4$ represents the condition of the respective output taps $c$ of m-sequence generator 20, the sequence of signals from each tap representing a true m-sequence. The fifth column $F_1$–$F_4$ represent the conditions of the respective output taps $d$ of the m-sequence generator 20. The sequence of signals from each tap $d$ corresponds to a complemented m-sequence.

The first shift pulse S1 causes the taps $c$ of the m-sequence generator 20 to change from the 1111 start condition to the 0111 condition. Taps $d$ therefore assume the 1000 complemented state and cause AND gate 31 of gate unit 21 to be conditioned. This allows data bit position $D_1$ to be checked for parity by stage $P_1$ of register 22. The first data bit is clocked out from the data source during clock pulse time C1 and is supplied to the gate unit 21, the data-out line 13 and the all check parity bit register 23 simultaneously. If the first data bit contains a 1, output tap $c$ of AND gate 31 will rise causing stage $P_1$ to change states. Similarly, a 1 in the first data bit position will cause stage $P_0$ to change states. Since in the present example $D_1$ is a 0, stages $P_1$ of register 22 and stage $P_0$ do not change states during clock time C1.

Shift pulse S2 thereafter causes taps $c$ of m-sequence generator 20 to advance to the 1011 condition. Taps $d$ therefore assume the complemented state 0100, which causes AND gate 32 of gate unit 21 to be conditioned. Data pulse $D_2$, which in the present example is a 1, passes through AND gate 32 and causes stage $P_2$ to change states. Data pulse $D_2$ also causes the $P_0$ stage to change states as indicated in the column designated $P_0$.

The above operation continues in a similar manner until the data bit position $D_1$–$D_{10}$ have been checked for parity. Clock pulses C11–C14 applied to input taps *a* of AND gates 40–43, respectively, cause parity bits $P_1$–$P_4$ to be supplied to the data-out line 13 through OR gate 36 and AND gate 35. Since parity bit positions $P_2$ check the bit position of the code group assigned to parity bit $P_1$, parity bit $P_1$ is also supplied to gate unit 21 during clock time C11. Similarly, since parity bit $P_0$ checks all the bit positions, the parity bits $P_1$–$P_4$ are supplied to the $P_0$ stage 23 and also to gate unit 21. The ten data bits $D_1$–$D_{10}$ and the five parity bits $P_1$–$P_0$, as shown on the last line of FIG. 3, are translated to the decoder 12 by the signal translating means 13.

Referring again to FIG. 1, the decoder 12 as shown therein comprises a shift register 50, an m-sequence generator 51, a gate unit 52, a reception parity bit register 53, an all check reception parity bit stage 54, an error detector unit 55, an error locator unit 56, an error corrector unit 57, and means 58 for modifying the condition of the m-sequence generator 51, and the reception parity bit register 53 under the joint control of the error detector 55, and the all check reception parity bit stage 54. A pulse generator 59 is also provided for supplying appropriate pulses to shift register 50, the m-sequence generator 51, and the error corrector unit 57.

Shift register 50 functions to store the first ten data bits of the code group supplied to the decoder 12. Gate unit 52 functions to assign the bit position of the fifteen bit code group to be checked to the various stages of the reception parity bit register 53 so that a reception parity check is made by register 53 over the entire code group in accordance with the manner in which the parity bits were generated. The all check register 54 functions to make a reception parity check over each of the bit positions of the code group. Error detector 55 functions to provide an error signal when the generated reception parity bits $RP_1$–$RP_4$ are not all 0's. The all check parity bit register 54 functions to indicate the type of error, e.g., single or double adjacent error, so as to modify the state of register 53 and the starting position of the m-sequence generator 51 if a double adjacent error has occurred. The error locator 56 functions to provide a signal to the corrector unit 57 when the state of the m-sequence generator 51 and the reception parity bit register 53 indicate that the bit position where the error begins is the corrector unit. The corrector unit 57 functions to complement the binary value of the bit (or bits) which is in error in response to the signal from the error locator, and in accordance with the type of error indicated by the all check parity register 54.

Figure 4:
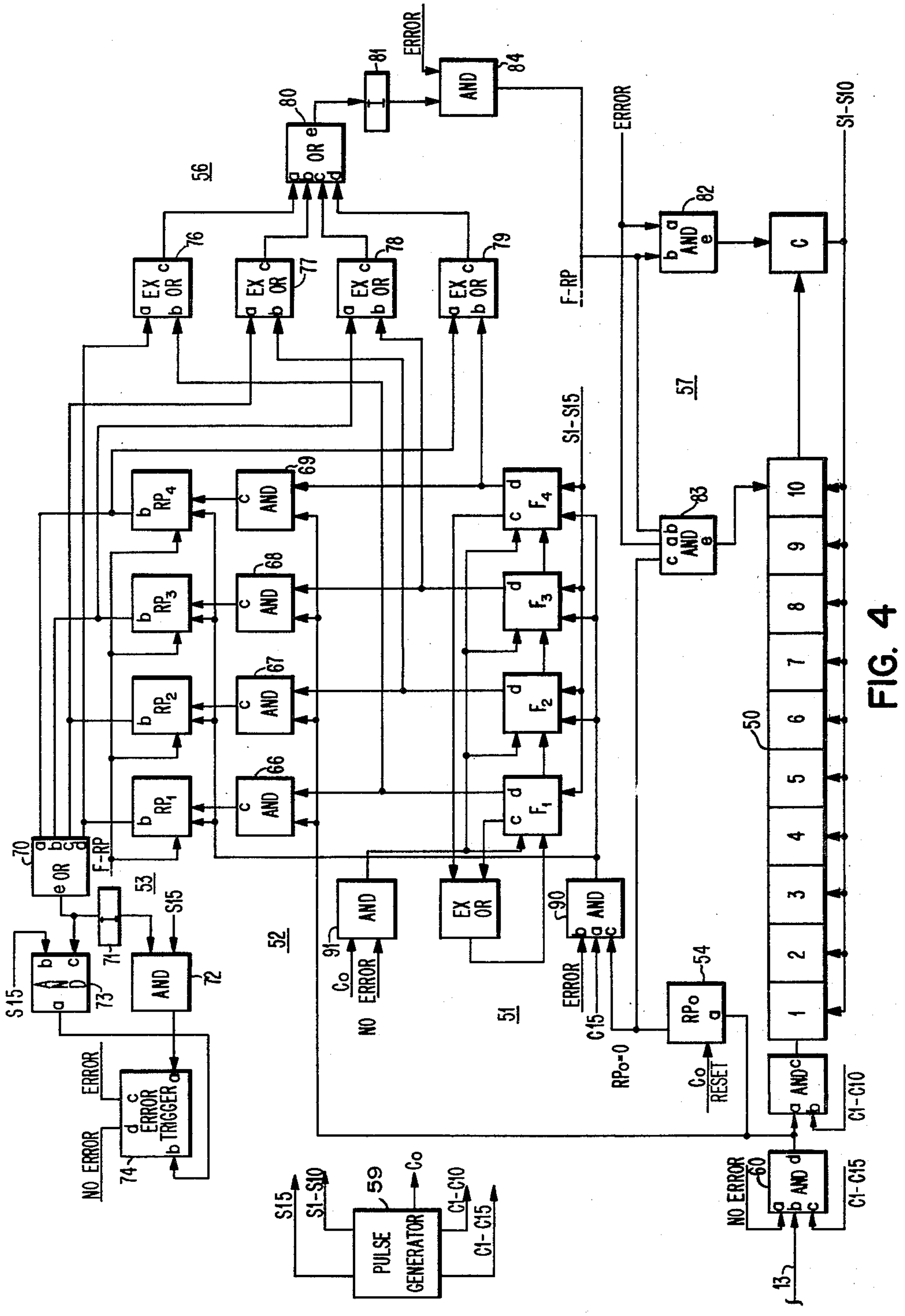
FIG. 4 is a diagrammatic view of the decoder shown in block form in FIG. 1.

The details of the decoder 12 are shown in FIG. 4, and as shown therein shift register 50 comprises ten stages 1–10. Data is supplied to the first stage 1 from the signal translating means 13 through a pair of serially connected AND gates 60 and 61. AND gate 60 has one input tap *a*, which is connected to the error detector unit 55 and is normally high, provided that an error has not occurred in the last code group which was received; a second input tap *b* which is connected to the signal translating means 13; and a third input tap *c* which is connected to the pulse generator and is supplied with clock pulses C1–C15.

The output tap *d* of AND gate 60 is connected to gate unit 52, to input tap *a* of AND gate 61, and to the input tap *a* of stage $RP_0$ of the all check parity bit register 54. The input tap *b* of AND gate 61 is connected to the pulse generator 59 and is supplied with clock pulses C1–C10. Output tap *c* of AND gate 61 is connected to the input tap of stage 1 of shift register 50, and hence shift register 50 is supplied with the first ten data bits of the code group, while gate unit 52 and all check register 54 are supplied with the ten data bits $D_1$–$D_{10}$ and the five parity bits $P_1$–$P_0$.

M-sequence generator 51, gate unit 52, reception parity bit register 53 and the all check parity bit register 54 are identical to the m-sequence generator 20, gate unit 21, parity bit register 22 and all check register 23, respectively, of the encoder 11, and hence the detailed description of these units is not repeated here. Generally, m-sequence generator 51 supplies four sampling signals to the four AND gates 66–69 of gate unit 52 so that the appropriate bit positions of the received code group are checked. The output taps *c* of AND gates 66–69 are connected to the stages $RP_1$–$RP_4$ of the reception parity bit register 52. A reception parity check of each bit position of the code group is therefore obtained by the reception parity bit register 53 and the all check register 54.

The error detector unit 55 comprises a four terminal OR circuit 70, an inverter 71, a pair of AND gates 72 and 73, and an error trigger 74. The four input taps *a*–*d* of OR circuit 70 are connected to the respective output taps *b* of stages $RP_1$–$RP_4$ of register 53. Output tap *e* of OR circuit 70 is connected to the input tap *a* of error trigger 74 through inverter 71 and AND gate 72, and also to input tap *b* of trigger 74 through AND gate 73. Taps *b* of AND gates 72 and 73 are connected to the pulse generator 59 and are supplied with an S15 pulse.

The error locator 56 as shown comprises four exclusive OR circuits 76–79, a four input OR circuit 80, and an inverter 81. The exclusive OR circuits 76–79 have one input tap *a* connected to the output taps *b* of stages $RP_1$–$RP_4$, respectively, of register 53, and input taps *b* connected to output taps *d* of stages $F_1$–$F_4$ of m-sequence generator 51. The output taps *c* of the exclusive OR circuits 76–79 are connected to input taps *a*–*d* of OR circuit 80, which has its output tap *e* connected to the inverter 81. The output signal of inverter 81 is normally low until the state of the m-sequence generator 51 and the reception parity bit register 53 coincide, at which time inverter 81 supplies a compare signal to the error corrector unit 57.

The error corrector unit 57 in this instance comprises AND gates 82 and 83. AND gate 82 has an input tap *a* connected to error tap *c* of error trigger 74, and an input tap *b* connected to the output tap of the error locator 56. AND gate 83 has its input taps *a* and *b* connected in a similar manner, but is provided with another input tap *c*, which is connetced to the output of the all check register 54. The output taps 3 of AND gates 82 and 83 are connected to stage C and stage 10, respectively, so as to complement the condition of these stages and correct the binary value located therein at the appropriate time when an error has occurred.

The operation of the decoder when no error occurs in translation of the code group may be seen by reference to FIG. 5, which is a chart illustrating the decoding of the fifteen bit code group transmitted by the encoder 11. Assuming error trigger 74 is set so that the no error tap *d* is high, conditioning AND gate 60, the fifteen bit code group is supplied to AND gate 61, the all check register 54, and the gate unit 52. The first ten data bits $D_1$–$D_{10}$ are entered into shift register 50 through AND gate 61 under the control of clock pulses C1–C10, and shifted from left to right under the control of shift pulses S1–S10 applied to each of the stages. M-sequence generator 51 provides the series of gating signals shown in column 5 to condition gate unit 52, and allow reception parity checks to be made over the appropriate bit positions of the fifteen bit code group. All check register 54 operates in a similar manner to generate an all check reception parity bit $RP_0$.

At the end of the reception parity check cycle each stage $RP_1$–$RP_4$ of register 53 is 0, and the output signal from OR circuit 70 is low. AND gate 72 of the error detector 55 is therefore conditioned by the signal being inverted. Shift pulses S15 applied to input tap *a* of AND gate 72 therefore supplies a signal to input tap *a* of error trigger 74. However, since the trigger is in the no error condition the pulse supplied to tap *a* does not cause trigger 74 to change states. The cycle is then repeated for the next code group with data bits $D_1$–$D_{10}$ of the first code group being shifted out to a suitable utilization device.

The operation of the decoder 12 in correcting a single error which has occurred during translation from the encoder may be seen by reference to FIG. 6 which assumes that the error has occurred in the sixth bit position of the code group, that is, data bit $D_6$ is changed from a 1 to a 0.

FIG. 6 is a chart similar to FIG. 5. As shown in FIG. 6 the operation of the decoder is identical to that which was just described up to the time that $D_6$ of the code group is supplied to gate unit 51. M-sequence generator 50 provides the same group of gating signals to gate unit 51 as in FIG. 5. However, since an error is present in the translated code group as received, the state of the reception parity bit register 53 at the end of the cycle is not all 0's. As shown in the chart of FIG. 6, register 53 assumes a 1001 condition, and the all check register 54 assumes a 1 condition. If the parity check table of FIG. 1A is consulted, it will be seen that condition 1001 is the locator subword for an error in the sixth bit position of the code group.

With 1001 in register 53, the output of OR circuit 70 is high, conditioning AND gate 73 so that the S15 pulse applied to tap *b* causes a signal to be supplied to tab *b* of error trigger 74, resulting in a change of states. The normally high no-error tap *d* of trigger 74 therefore changes to a low state, while the normally low error tap *c* changes to a high state and conditions AND gates 82, 83 and 84.

The input AND gate 60 is deconditioned by the drop of the no-error input tap *d*, and, hence, no data is supplied to either the shift register 50, the gate unit 52 or the all check register 54 until the error is located and corrected. The reception parity bit register 53 therefore maintains its 1001 condition until the error is located. However, shift pulses S1–S15 supplied to the m-sequence generator 51 cause it to cycle, while shift pulses S1–S10 supplied to the shift register 50 cause the group of data bits $D_1$–$D_{10}$, stored in the shift register, to be shifted out through stage C of the error correcting unit 57. It will be seen from the lower portion of FIG. 6 that the condition of the m-sequence generator 51 and the reception parity bit register 53 coincide at shift pulse time S6. It should also be noted that at shift pulse time S6, the sixth position of the code group which contains the bit in error has been shifted into stage C of corrector unit 57.

Since AND gate 82 has been conditioned by the error signal from error trigger 74 at S15 time, the F–RP compare signal from the error locator 56 at shift time S6 is supplied to stage C through AND gate 84 as a correct-command signal. The correct-command signal causes the condition of stage C to reverse which, in effect, complements or corrects the value of the data bit presently in stage C. As shown in FIG. 6, the error in bit position 6 consisting of a 0 is corrected by changing it to a 1. The corrected data $D_6$ and subsequent bits $D_7$–$D_{10}$ are shifted out of the register through stage C to a suitable utilization device.

The reception parity bit register 52 in this instance is reset to the all 0 condition by the F–RP signal from the error locator 56 so that when the next S15 pulse is supplied to the error detector 55, a signal is supplied to terminal *a* of the error trigger 74 through AND gate 72, which is conditioned by the inverted normally low output signal of OR gate 70. The signal supplied to terminal *a* of error trigger 74 causes the trigger to change states and restore the decoder to its original starting condition. The decoder will operate in the above described manner to correct automatically a single error occurring in any of the data bit positions $D_1$–$D_{10}$.

The operation of the decoder 12 in correcting a double adjacent error which has occurred during translation from the encoder may be seen by reference to FIG. 7, which assumes that the double adjacent error has occurred in the seventh and eighth positions of the code group, that is, data bits $D_7$ and $D_8$ are changed from 0 and 1 to 1 and 0, respectively.

FIG. 7 is a chart similar to FIG. 5. As shown the operation of the decoder is identical to that described previously up to the time that data bit $D_7$ of the code group is supplied to gate unit 51. M-sequence generator 50 provides the same group of gating signals to gate unit 51 as in FIG. 5. However, since a double adjacent error is present in the translated code group as received, the state of the reception parity register 53 at the end of the cycle is not all 0's. As shown in the chart of FIG. 7 register 53 assumes a 1010 condition and the all check register 54 assumes a 0 condition including a double adjacent error.

If the parity check table of FIG. 1*a* is consulted, it will be seen that mod. 2 addition of the locator subwords for bit positions 7 and 8 result in the 1010 condition, and that the complement 0101 corresponds to the locator subword for a single error in bit position 4. The three positional shift between the complement of the locator subword for a double adjacent error and the locator subword for a single error is maintained throughout the table. The three positional shift is characteristic of the particular m-sequence chosen for the example. Other m-sequences would provide other positional shifts.

Since $RP_1$–$RP_4$ are not all 0's the output of OR gate 70 is high, which conditions AND gate 73. A shift pulse S15 supplied to terminal *b* of AND gate 73 causes error trigger 74 to change states. The drop of the no error tap *d* deconditions the input AND gate 60. The error tap *c*, on the other hand, conditions AND gate 90 and also AND gates 82, 83 and 84, as in the case of a single error. Tap *c* of AND gate 90 is supplied with the output signal from the all check register 54, so that when clock pulse C15 is supplied to tap *a*, a signal is supplied from AND gate 90 to each stage $RP_1$–$RP_4$ of register 53 and to stages $F_2$–$F_4$ of m-sequence generator 50. The signal supplied to register 53 complements the condition of register 53 so that in the present example the 1010 condition is changed to a 0101 condition. The signal supplied to stages $F_2$–$F_4$ complements the condition of these three stages and changes the 1111 normal start condition to a 1000 start condition. This, in effect, is equivalent to starting the m-sequence generator at a point corresponding to the three poistional shift.

Shift pulses S1–S15 supplied to the m-sequence generator 51 cause m-sequence generator 51 to advance. Shift pulses S1–S10 supplied to the shift register 50 cause the data to be shifted out through stage C. When the condition of the reception parity bit register 53 corresponds to the condition of taps *d* of the m-sequence generator the output tap *e* of OR gate 80 drops, supplying a correct-command to AND gates 82 through AND gate 83. Since AND gate 83 is now conditioned by the output signal from the all check register 54, the condition of stage 10 and stage *c* are complemented or corrected. Hence, corrected data is supplied from the decoder.

The RP–F compare signal, as in the case of a single error, resets register 53 to the 0000 condition so that when shift pulse S15 is supplied to AND gate 72, error trigger 74 is caused to return to the no error condition. The m-sequence generator 51 is supplied with a signal from AND gate 91 at clock pulse time C0, which insures that the 1111 normal start condition is obtained for the next cycle. The decoder 12 is then in position to handle the next code group.

It will be seen that a relatively simple system is provided for correcting both single and double adjacent errors which occur in binary code groups. While the system has been explained in the environment of data communications, it will be recognized by those skilled in the art that other applications are possible. For example, in recording on magnetic surfaces such as tape, which are subject to defects, errors may occur during read-out which, in effect, correspond to the type of error encountered during translation of the code group in communication systems. Hence the error correcting system of the present invention may also be employed in the environment of a magnetic recording system.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In combination with an information handling system having a source of binary coded multi-bit data signals and a device for utilizing said signals, an error correcting system interconnecting said data source and said utilization device operable to detect, locate and correct two types of related errors occurring during the translation of said data signals to said device, said correcting system including an encoder, a decoder and signal translating means connected therebetween, said encoder comprising means for supplying to said signal translating means a code group signal consisting of a predetermined number of data bits, a predetermined number of locator parity bits and an error-type parity bit, said supplying means including means for generating said locator parity bits from bit positions of said code group signal determined by a complemented m-sequence and means for generating said error-type parity bit from each bit position of said code group signal, said decoder comprising means for generating reception parity bits from said code group signal as received over bit positions determined by said complemented m-sequence, means for generating a reception error-type parity bit, and means under the control of said generated reception parity bits operable to correct any one of said different types of related errors in any position of said code group prior to supplying an erroneous data bit to said utilization device.

2. The combination recited in claim 1 in which said locator parity bit generating means of said encoder comprises a storage register having one stage for each locator parity bit to be generated, a plurality of sampling circuits each having an output terminal connected to a different said stage, means for sequentially supplying bits of said data signal to each of said sampling circuits, and an m-sequence generator connected to said sampling circuits for supplying trains of sampling signals thereto corresponding to said complemented m-sequence and in timed relationship with the sequence of bits in said data signal.

3. The combination recited in claim 2 in which said error-type parity bit generating means comprises a storage register having one stage, and means for sequentially supplying bits of said data signal to said one stage.

4. The combination recited in claim 3 in which said m-sequence generator comprises a maximal length binary shift register.

5. The combination recited in claim 1 in which said reception parity bit generating means includes means for generating a plurality of locator reception parity bits from bit positions of the received signal determined by the complement of said m-sequence, and an error-type reception parity bit from each bit position of said received signal.

6. The combination recited in claim 5 in which said locator reception parity bit generating means includes an m-sequence generating, a sampling circuit and a storage register.

7. The combination recited in claim 6 in which said m-sequence generator comprises a maximal length binary shift register.

8. A system operable to detect, locate and correct two types of related errors in a transmitted code group of N binary bit positions consisting of K locator parity bits, a single error-type parity bit and M data bits where $N=2^K-1$ or less comprising in combination an encoder, a decoder, and means connected therebetween for transmitting said code group from said encoder to said decoder, said encoder comprising means for generating K locator parity bits over bit positions of said code group determined in accordance with the complement of an m-sequence, means for generating said error-type parity bit over each bit position of said code group, and means for supplying said parity bits to said transmitting means in sequence following the last data bit, said decoder comprising means to receive said transmitted code group, means for making a reception parity check over bit positions of said received code group in accordance with said m-sequence to provide K locator reception parity bits, and a single reception error-type parity bit, means under the control of said reception parity bits for correcting any one of said related errors which might have occurred in any bit position during transmission of said code group between said encoder and said decoder.

9. The combination recited in claim 8 in which the means for making said reception parity check includes an m-sequence generating means for providing complemented m-sequence signals.

10. The combination recited in claim 9 in which said m-sequence generating means comprises a K stage shift register having a feedback path extending to said first stage from other predetermined stages through an exclusive OR circuit.

11. The invention recited in claim 9 in which said correcting means includes means for modifying the condition of said locator reception parity bits and the starting condition of said m-sequence generating means in response to a predetermined condition of said single reception error type parity bit.

12. In a system for correcting two types of related errors in a translated binary code group, an encoder comprising the combination of parity bit generating means including an m-sequence generator, a first gate unit, a parity bit register, and an all check parity bit device; a second gate unit, a pulse generator, means for supplying a group of serial data bits to said first gate unit and said all check device under the control of timing signals from said pulse generator, means connecting said pulse generator to said m-sequence generator to advance said sequence generator in timed relation with said timing signals, means connecting the output of said sequence generator to said gate unit for selectively conditioning said gate unit, means connecting the output of said gate unit to said parity bit register for storing the modulo 2 sum of the output signals of said first gate unit, means connecting the output of said parity bit register to said second gate unit, means connecting the output of said second gate unit to said first gate unit and said all check parity device, and means connecting said pulse generator to said second gate unit to sample said register and said device at preselected times whereby said sequential group of data bits translated to said decoder are followed immediately by a sequential group of parity bits.

13. The combination recited in claim 12 further comprising signal translating means interconnecting said decoder and said encoder, said decoder comprising means corresponding to said parity bit generating means of said encoder for generating reception parity bits, means responsive to said generated reception parity bits for indicating the occurrence of an error, means responsive to one of said parity bits for indicating the type of said error, means for locating said indicated error in response to the condition of said other reception parity bits, and means under the control of said error locating means and said one parity bit for corretcing said error.

References Cited in the file of this patent

UNITED STATES PATENTS

| | | |
|---|---|---|
| 2,552,629 | Hamming | May 15, 1951 |
| 2,956,124 | Hagelbarger | Oct. 11, 1960 |
| 2,969,912 | Reynolds | Jan. 31, 1961 |

FOREIGN PATENTS

| | | |
|---|---|---|
| 211,165 | Australia | Oct. 24, 1957 |

OTHER REFERENCES

J. H. Green, Jr. and R. L. San Soucie: "An Error-Correcting Encoder and Decoder of High Efficiency," Proceedings of the IRE, pp. 1741–1744, October 1958.

I.R.E. Transactions on Vehicular Communication, April 1959, pp. 74–85, by Green and Gordon: "A Digital Selective Signaling System for Mobile Radio."